United States Patent [19]

Heffron

[11] Patent Number: 6,084,132
[45] Date of Patent: Jul. 4, 2000

[54] FLUORESCENT DYES

[75] Inventor: Peter J. Heffron, Flemington, N.J.

[73] Assignee: Rohm and Haas Company, Philadelphia, Pa.

[21] Appl. No.: 09/454,115

[22] Filed: Dec. 3, 1999

[51] Int. Cl.⁷ .................................................. C07C 211/00
[52] U.S. Cl. .......................... 564/426; 570/129; 570/143; 570/183; 570/208; 568/585; 568/628; 568/632; 585/411; 564/308
[58] Field of Search ..................................... 570/129, 143, 570/183, 208; 568/585, 628, 632; 585/411; 564/308, 426

[56] References Cited

U.S. PATENT DOCUMENTS 4,486,587 12/1984 Seybold .
5,958,780 9/1999 Asher et al. .

Primary Examiner—Alan Siegel
Attorney, Agent, or Firm—Thomas D. Rogerson

[57] ABSTRACT

Fluorescent dyes which fluoresce in a variety of colors are produced from substituted and un-substituted 6-ring and 8-ring aromatic diketones by reductive alkylation with alkyl halides in the presence of zinc.

2 Claims, No Drawings

FLUORESCENT DYES

The present invention is directed to fluorescent dyes useful for leak detection, pipeline interface detection, and crude oil detection in depleted wells. The invention provides fluorescent dyes which fluoresce at a variety of wavelengths.

BACKGROUND OF THE INVENTION

Fluorescent dyes have been produced from violanthrone (C.I. Vat Blue 20) and isoviolanthrone (C.I. Vat Violet 10), nine-ring aromatic diketone structures, by reductive alkylation with alkyl halides and zinc powder at elevated temperatures. These dyes fluoresce a green-yellow color. Complex apparatus may have a number of fluid lines; thus, it would be desirable to be able to differentiate by fluorescent dye color the source of a leak.

Also, the dyes may be used for tagging and identifying liquids, such as petroleum fuels. The availability of fluorescent dyes of a variety of hues increases the utility of such dyes for this purpose. Fluorescent dyes may be detected by apparatus described in U.S. Pat. No. 5,958,780, the teachings of which are incorporated herein by reference. Two fluorescent dyes which fluoresce at significantly different wavelength may be used in a binary tagging system which provides for an essentially unlimited number of identifying combinations.

Accordingly, it is a general object of the present invention to provide fluorescent dyes which fluoresce at wavelengths different from currently available fluorescent dyes.

SUMMARY OF THE INVENTION

In accordance with the present invention, fluorescent dyes which fluoresce at a variety of wavelengths are produced by reductive alkylation of substituted and un-substituted 6- and 8-aromatic ring diketones. The aromatic diketones are reacted with alkyl halides and zinc, the reductive alkylation removing the diketone functionality from the structure and adding between 2 and 6 alkyl groups, on average, to the ring structures. Depending upon the number of substituent groups on the ring structure, and the number and structure of the alkyl groups added, fluorescent dyes which fluoresce at a variety of wavelength are produced. Example of fluorescent colors which are produced include green, yellow-green, yellow and orange. Even dyes which appear close in color to prior art dyes have maximum fluorescent wavelengths which differ sufficiently to be separately detected spectrophotometrically. As 6 and 8 member ring structures are less stable than the 9 member ring structures previously used to form fluorescent dyes, it is surprising that these ring structures can be reductively alkylated by the relatively harsh conditions of reductive alkylation. Substituted multi-ring structures tend to be even less stable, yet applicants have been successful at reductively alkylating these as well.

DETAILED DESCRIPTION OF CERTAIN PREFERRED EMBODIMENTS 6-aromatic ring diketones used as starting material in accordance with the invention have the formulae:

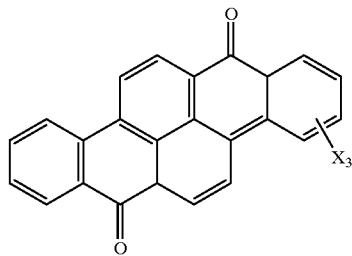

(I)

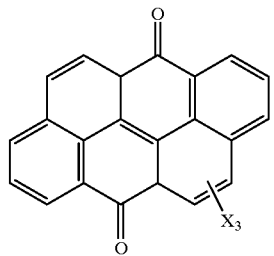

(II)

where the Xs are the same or different and are selected from H, Cl, F, I, O-(C1–C8)alkyl, $NO_2$ and $NY_2$ there the Ys are the same or different and are selected from H or (C1–C8) alkyl. In these structures ((I) and (II)) the Xs may be at any available position in the ring structure.

Substituted and un-substituted pyranthrones (8 aromatic ring diketones) used as starting materials have the general formula (III), where Xs are as defined above. Again, the Xs may be at any available position on the ring structure.

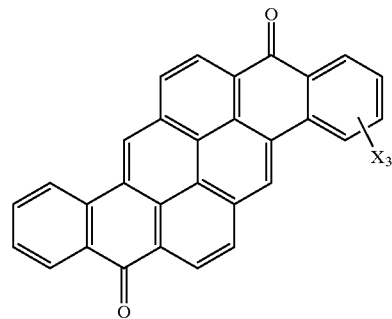

(III)

Examples of suitable starting dyes include for example:

| | |
|---|---|
| C.I. Vat Orange 9 | pyranthrenedione (un-substituted) |
| C.I. Vat Orange 2 | dibrominated pyranthrenedione |
| C.I. Vat Orange 4 | tribrominated pyrantbrenedione |
| C.I. Vat Orange 1 | dibrominated 6-ring dione. |

The starting dyes are reacted with an excess alkyl halide, generally an alkyl chloride, in the presence of zinc so as to provide a high degree of alkylation of the ring structure. Reductive alkylation occurs at the ketone group sites and additional alkylation occurs around the ring structures when an excess of alkyl halide is used. By "excess" is meant herein an amount in excess of 6 moles of alkyl halide per mole of starting dye of formula (I), (II) or (III). Typically, on each molecule, the ring structure is alkylated with 2–6 alkyl groups, most typically 6 alkyl groups, when a substantial excess of alkyl halide is used as the reactant.

The alkyl groups of the alkyl halides have between 1 and 12 carbon atoms, preferably between 6 and 12. Preferably the alkyl groups of the alkyl halides are linear. As the zinc is provided in powdered, zero valence, form, it is generally used at a considerable stoichiometric excess. In the reaction, both reductive and non-reductive alkylation occur. In substituted ring structures, some loss of substituent (X) groups may occur, though it is difficult to determine the extent, if any, this may occur.

Accordingly, the fluorescent reactant products of (I), (II) and (III) have the general formulae:

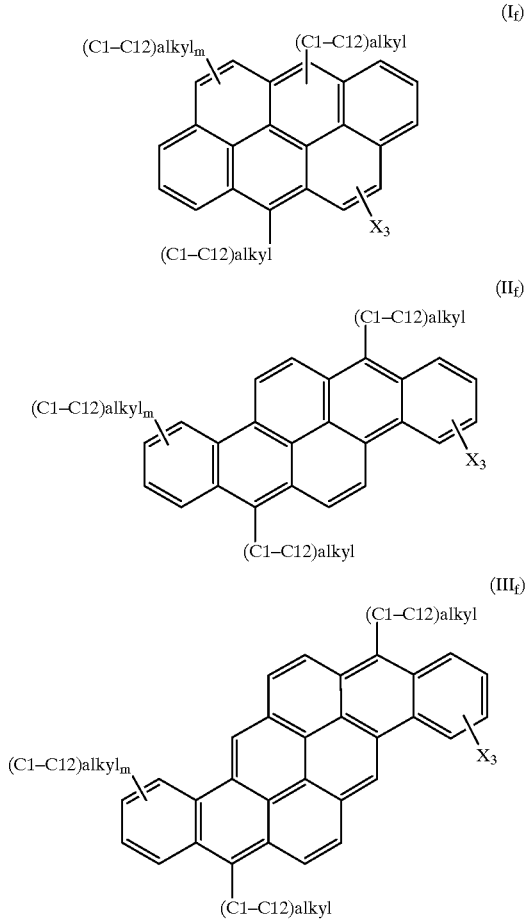

where the Xs are as defined above and m=0–4. The alkyl groups, other than those replacing the ketone groups, may be at any available location along the ring structure.

The dyes produced in accordance with the invention are liquids, making them easy to mix with other fluids, such as petroleum fuels and air conditioning refrigerants. The dyes are fully miscible with both petroleum fuels and refrigerants.

The invention will now be described in greater detail by way of specific examples:

EXAMPLE 1

Into a one liter three necked flask fitted with thermometer and a Dean Stark trap with condenser was charged 400 grams (1.96 g-mol) Lauryl Chloride. This was followed by the addition of 40.6 grams (0.10 g-mol) C.I. Vat Orange 9 (pyranthrenedione). The assembly was wrapped in insulation gauze.

The mixture was dried under slight vacuum by heating to 150° C. to remove moisture. The flask was purged with a nitrogen atmosphere. The temperature was then raised to 205–210° C. and a charge (3.0 grams) of zinc powder was quickly added through the third neck, fitted with a stopper. The temperature was raised further to 210–215° C. wherein a second charge (3.0g) of zinc powder was quickly made. The temperature was raised further to 223–225° C. and held in this temperature range for 1 hour.

As the reaction initiated and proceeded, the internal temperature of the contents was lowered by the formation of product(s). Six additional charges of zinc powder (3.0 g) were added over a period of two hours at twenty-minute intervals. During this time Hydrochloric Acid was formed. The temperature was slowly raised to 223–223° C. and held there for eight hours. Then the temperature was raised to 238–240° C. for four hours to complete the reaction.

The temperature was then lowered to 80° C. To the reaction mixture was added 300 g of Hydro-treated Napthenic oil. The slurry was then filtered at ambient temperature on a 1-micron polypropylene cloth to obtain a liquid dye filtrate weighing 600 grams. The product fluoresces a green color and has long wavelength absorption at 471 nm and a fluorescent emission at 477 nm (in hexane).

EXAMPLE 2

The same procedure was used as in Example 1 except 56–38 grams (0.10 g-mol) of C.I. Vat Orange 2 (dibrominated pyranthrenedione) were charged to the reaction flask.

The concentrated reaction mixture was filtered directly at 80° C. and split into two portions. To one portion was added an equal weight of Hydro-treated Napthenic oil and to the other an equal weight of a polyester lubricant. The dye fluoresces yellow-green. It has a long wavelength absorption at 466 nm and a fluorescent emission at 475 nm (in hexane).

EXAMPLE 3

A dye was prepared in a similar manner from Vat Orange 1. The dye fluoresces a pale green color with a long wavelength absorption maximum of 454 nm and an emission wavelength of 491 nm.

What is claimed is:

1. Fluorescent dyes having the formulae:

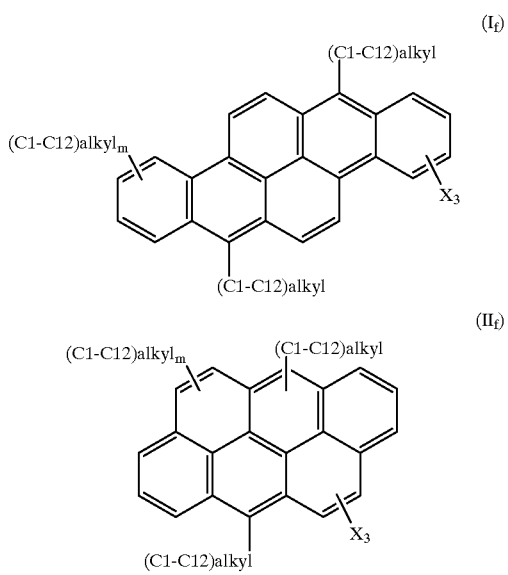

-continued

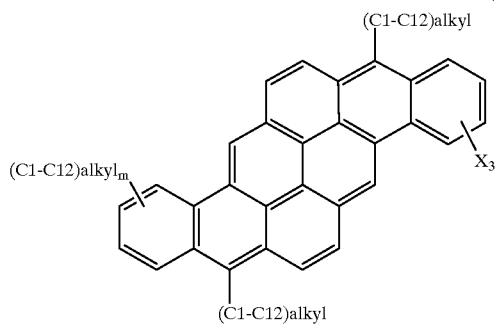
(III_f)

where the Xs are the same or different and are selected from H, Cl, F, I, O-(C1–C8)alkyl, $NO_2$ and $NY_2$, where the Ys are the same or different and are selected from H or (C1–C8) alkyl; and m=0–4.

2. A method of preparing dyes of claim 1 comprising providing dyes of the formulae selected from:

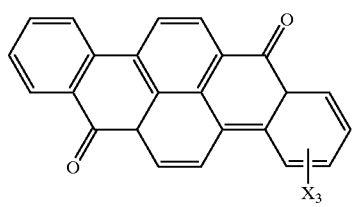
(I)

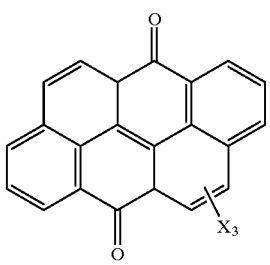
(II)

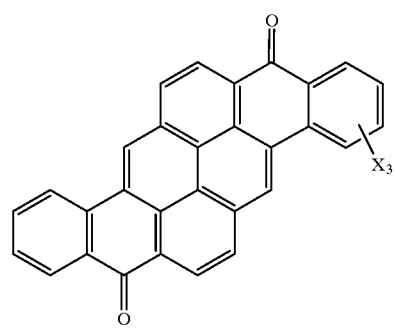
(III)

and reacting said dyes of formulae (I), (II) or (III) with an excess alkyl halide in the presence of zero valence zinc.

* * * * *